United States Patent [19]
Banbrook et al.

[11] Patent Number: 5,640,325
[45] Date of Patent: Jun. 17, 1997

[54] SENSOR ARRAY DYNAMIC POSITION AND ORIENTATION DETERMINATION SYSTEM

[75] Inventors: Hal W. Banbrook; James R. Huddle, both of Chatsworth; Emery L. Moore, Thousand Oaks, all of Calif.

[73] Assignee: Litton Systems, Inc., Woodland Hills, Calif.

[21] Appl. No.: 243,889

[22] Filed: Sep. 13, 1988

[51] Int. Cl.$^6$ .................................................. G01C 21/00
[52] U.S. Cl. .......................................... 364/453; 364/449.1
[58] Field of Search ..................................... 364/449, 453, 364/454, 460

[56] References Cited

U.S. PATENT DOCUMENTS

| | | | |
|---|---|---|---|
| 3,866,229 | 2/1975 | Hammack | 364/460 |
| 4,222,272 | 9/1980 | Mairson | 364/453 |
| 4,232,313 | 11/1980 | Fleishman | 364/460 |
| 4,445,376 | 5/1984 | Merhav | 364/453 |
| 4,870,588 | 9/1989 | Merhav | 364/453 |

OTHER PUBLICATIONS

Orr Kelly, "Sub Duels Under Polar Ice": How Ready Is U.S.?, U.S. News & World Report, Mar. 5, 1984, p. 35.
Marc E. Liebman, "Towed Array Sonar", DS&E, Dec. 1986, p. 13.
Tim Carrington, "Undersea Arms Race Is Preoccupying Navies Of U.S., Soviet Union", The Wall Street Journal, Jun. 24, 1987.

*Primary Examiner*—David C. Cain
*Attorney, Agent, or Firm*—Oppenheimer Poms Smith

[57] ABSTRACT

A system, which uses inertial measurement units, is shown for determining the position and orientation of a towed array of sensors used for target detection. The system uses an onboard master inertial navigation system and a relative position determination mechanism to generate a first estimated position for each inertial measurement unit within the array. Each inertial measurement unit measures force and angular change information used by an onboard computer to create a second estimated position by known methods for each inertial sensor. An error signal represented by the difference between the two estimated positions for each inertial unit is processed over time by a Kalman filter to reduce the error in the heading and attitude determined for each inertial unit to establish an accurate location for each inertial unit and, thus, the towed array of such units.

6 Claims, 3 Drawing Sheets

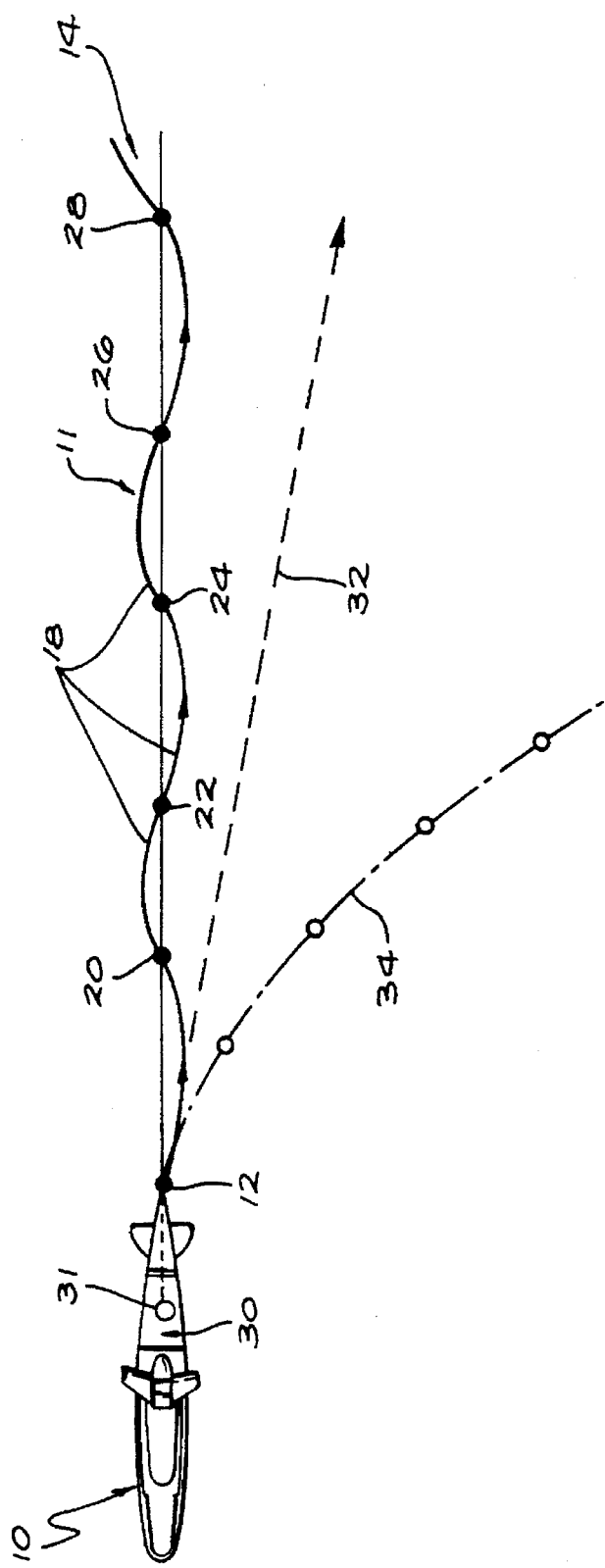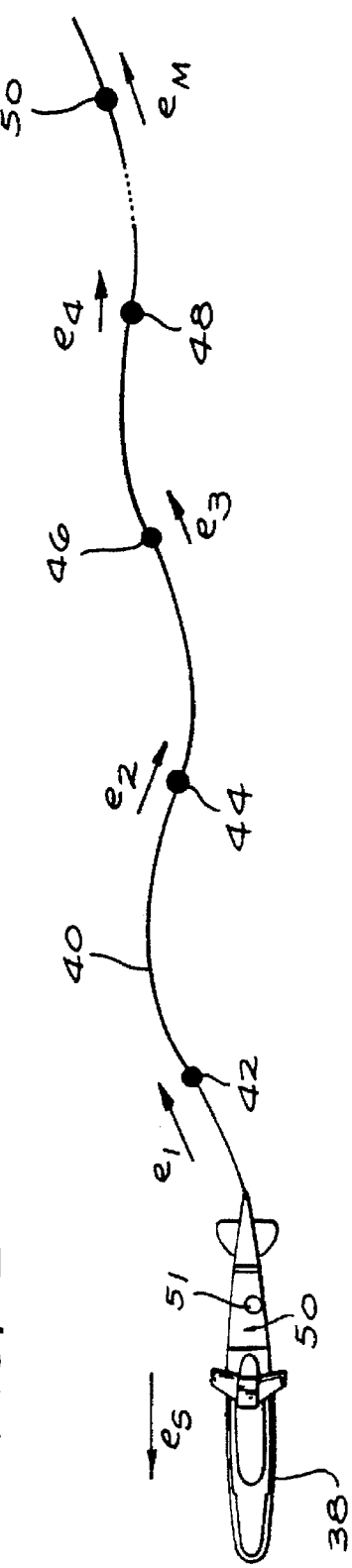
FIG. 1
FIG. 2

SENSOR ARRAY DYNAMIC POSITION AND ORIENTATION DETERMINATION SYSTEM

FIELD OF THE INVENTION

This invention relates to, but is not limited to, acoustic towed arrays used primarily by naval vessels. More particularly, this invention relates to the use of inertial sensors positioned along a flexible array of sensors to accurately determine the contour of the array dynamically which thereby enhances the estimates of a detected target position.

BACKGROUND OF THE INVENTION

Naval vessels use flexible towed arrays of hydrophones for determining the presence and location of targets emitting or reflecting acoustical energy in the vicinity of the towing vessel. Typically a towed array is wound on a spool and stored on the ship for deployment at sea when needed for target detection and location. These towed arrays are generally of flexible tubing and contain discrete acoustical sensors distributed along the array which can be a mile or more in length.

A prior design for towed arrays would have acoustical sensors positioned along the length of the array which are linked for communication to a computer on the towing vessel. The computer processes the multiplicity of information obtained from the sensors along the full length of the array. When an acoustic signal emitted or reflected off a target is detected by the acoustical sensors, this information is used in the onboard computer to obtain an estimate of the detected target position.

More recently target detection and location has been improved to include towed array heading information obtained from outputs of magnetic sensors positioned at discrete points along the array. Discrete towed array heading information enables improved position estimates for the acoustical sensors which, in turn, provides phase corrections for the sonar data and allows improved system performance.

Magnetic heading sensors which have been used in towed arrays can determine magnetic heading but are limited in accuracy and bandwidth. The accuracy of the magnetic heading measurement is strongly influenced by known and unknown local magnetic anomalies. Typically the geometry of the array is varying dynamically, predominantly along a direction lateral to the course of the towing vessel. This effect is greatest during turns. Limited stretching also occurs down the towed array. Further, significant lateral motions occur due to cross currents. At polar latitudes, random disturbances of the magnetic field increase due to environmental influences with an accompanying degradation in accuracy of the magnetic heading sensors. Finally, the magnetic heading sensor measurements take from seconds to minutes to stabilize after dynamic changes caused by the factors discussed above.

This time lag for determining the lateral position of the towed array is too long for many applications. Therefore, magnetic sensors perform inadequately in most dynamic situations.

To achieve accurate targeting, it is necessary to have accurate estimates of the actual location of each of the acoustical sensors positioned at intervals along the towed array.

The use of inertial heading sensors as an improvement over magnetic heading sensors has been suggested. However, not until recently has inertial technology progressed to a point where the size and quality of inertial sensors make such usage feasible. Even with the modern inertial sensor technology there remained, until now, the unsolved problem of providing initialization, or alignment, of an inertial sensor in the undulating, rotating towed array at a remote point from the source of reference.

Heretofore, other techniques have been used to obtain alignment of remote or slave inertial systems on naval vessels. The problem has been to obtain an estimate of the heading of a remote object (slave) with respect to the ship's master or reference inertial system. For example, between a ship (master) and a missile (slave) mounted upon the ship's deck.

Generally, since both the master unit and slave unit have inertial sensors for determining orientation, known relative position (lever arm) and orientation between the master and slave unit can be used in establishing the initial position and alignment of the slave inertial system. The initial alignment of the slave inertial system using this method is generally not accurate due to so called boresight error and lever arm flexure.

Subsequently, dynamic changes in the differences between the error in computed position of the master and slave inertial systems can be observed via comparison. These differences may be processed through a Kalman "transfer alignment" filter. From this processing, corrections can be made to modeled error states, such as, slave position, velocity, heading and attitude. By this method, the inaccurate initial alignment described above is much improved. Such position comparison systems were hereto-fore directed to those situations where the locations of the master and slave units relative to one another, did not vary with time.

Determining the position, velocity, heading and attitude of points along a towed array is a more difficult problem as the relative displacements between the master inertial system on the vessel and the slave inertial systems in the towed array vary with time. Thus the standard transfer alignment mechanization may not be used for a towed array application.

SUMMARY OF THE INVENTION

What is needed for a vessel towing a set of acoustic sensors, to accurately determine the location of a target using information provided by the acoustic sensors, is a second set of sensors which accurately determine the dynamic changes in the towed array configuration. The invention is directed to a system for determining the position and orientation of a series of sensors along an undulating array at spaced points and hence determining the position and orientation of the full array under such dynamic conditions. Because of the self-contained, highly practical application of the position and orientation determining systems (PODS), target detection and location using this system can be greatly improved.

The system includes a plurality of remote inertial measurement units (IMUs) at pre-determined intervals along a towed array. A master inertial navigation system (INS) aboard the towing vessel is related to each of these inertial measurement units. Estimates of the positions of the remote inertial measurement units are obtained in two stages:

A first system determines the position of each remote inertial measurement unit employing the master inertial navigation system. A relative position determination mechanism generates a relative lateral position estimate between any two adjacent inertial measurement units using a heading estimate obtained from measurements of the first such inertial sensor and a heading estimate obtained from measurements of the second such adjacent inertial sensor further along the towline from the towing vessel. This computation is a function of the heading estimates of the first and second inertial sensors and determines the relative position change between the inertial sensors as a displacement along a vector whose direction is the average heading of the first and second inertial sensors. A relative depth position estimate is similarly obtained between any two adjacent inertial sensors using attitude estimates obtained from measurements of the first and second inertial sensors. The combination of heading and attitude estimates yields an orientation estimate. Longitudinal position of the sensors is determined from a prior knowledge of distance between sensor locations in the towline and the change in this distance due to the elastic characteristics of the towline when subjected to towing forces and environmental effects, such as temperature.

In a second system, the position; velocity, heading and attitude of each sensor is determined individually and directly using the force and angular change measurements obtained from each remote inertial measurement unit in combination with navigational computers. These determinations are accomplished using the known methods of inertial navigation.

The difference in the comparison of position determined by the first and second systems yields an error signal that is used by a correction process to improve the accuracy of the estimates of the navigation values of position, velocity, heading and attitude of each and every remote inertial sensor. In the preferred embodiment, this correction process is implemented by a Kalman filter in the central computer on the towing vessel.

BRIEF DESCRIPTION OF THE DRAWINGS

FIG. 1 is a schematic representation of a vessel having an onboard master inertial navigation system and a connected towline in which is embedded a set of inertial measurement units for use in the position, velocity, heading and attitude determination system of the invention.

FIG. 2 is a schematic representation of a vessel and towed array showing the position of inertial measurement units along the array, each unit having a particular towline direction vector ($\vec{e}$) associated with it.

DETAILED DESCRIPTION OF THE PREFERRED EMBODIMENT

Figure 3:
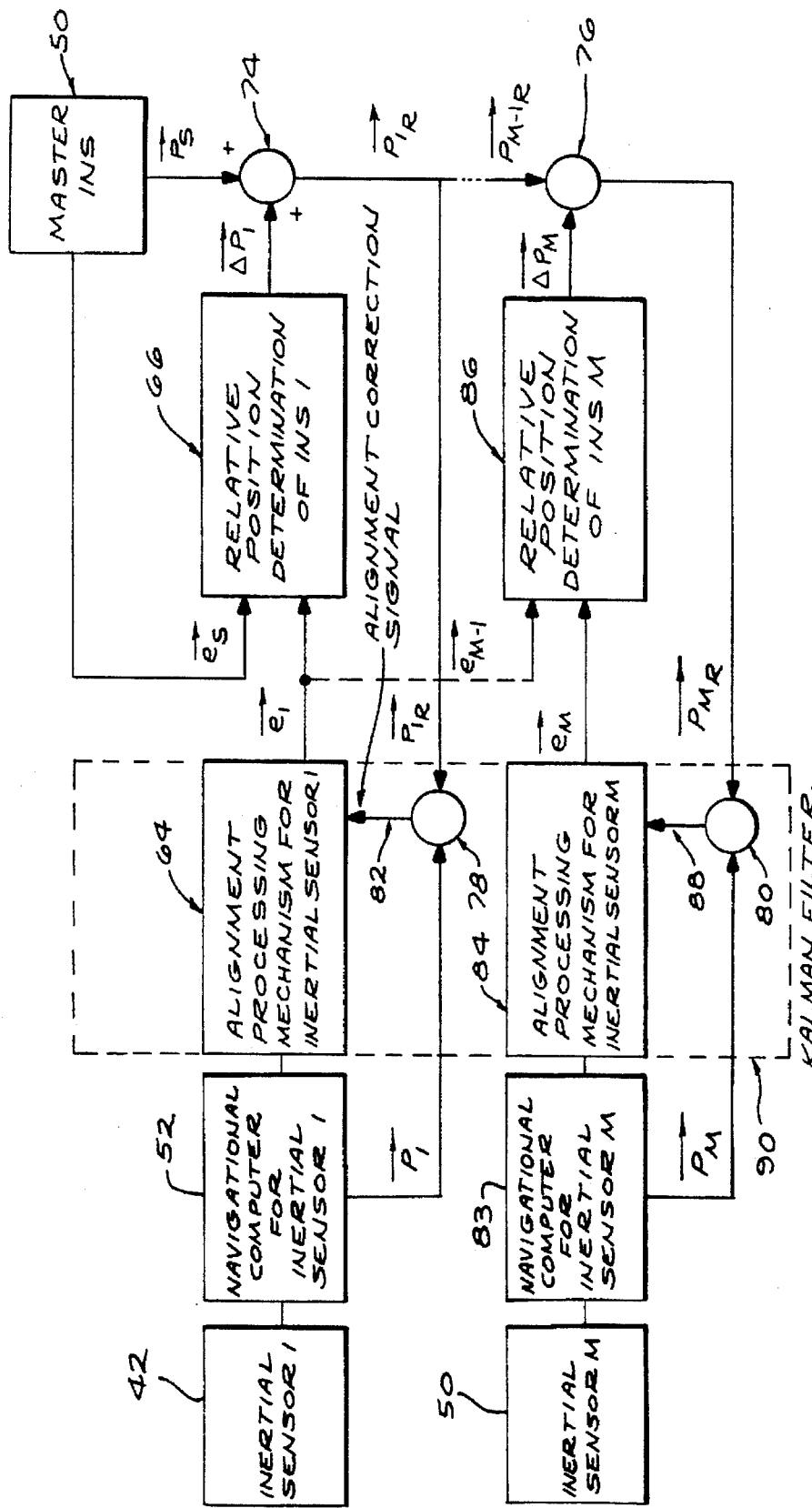
FIG. 3 is a block diagram representing the information processing flow for determination of position and orientation for the inertial measurement units in the towed array.

With reference to FIG. 1, a navigational vessel 10, such as a surface ship or submarine, is shown towing an array 11, which is connected to the stern of the ship at a fixed position 12, while the other end 14 thereof is left to freely float in the water. Positioned continuously along the towed array 11, shown as a dark heavy line, are a plurality of acoustic sensors 18 which may be used for target detection. Also positioned at intervals along the towed array are a plurality of remote inertial measurement units (IMUs) 20, 22, 24, 26, and 28, for example. Onboard the navigational vessel 10 is a master inertial navigation system (INS) 30 which includes a central computer 31 for processing data received from the towed array 11.

In the preferred embodiment, the towed array 11 is a long flexible tubing having a diameter from 1 to 3 inches. The tubing may contain a fiber optic cable, not shown, for communication of remote inertial unit signals to the computer 31 on board the towing vessel. The remote inertial measurement units may each have fiber optic gyros and silicon accelerometers, not shown, to make measurements along each of the three spatial directions.

FIG. 1 illustrates a case example of array positioning error due to an under-sampling of the array contour 11. Consider such a sampling if only the directions measured at locations 12, 22 and 26 were available. This results in an estimated position and orientation for the towed array along the dashed line 32. This illustrates the need for additional directional sensors 20, 24 and 28 to be positioned along an under-sampled contour so that the position and orientation of the array is more accurately determined. Dashed line 34 illustrates the extreme variations between inertial sensors when a towing vessel makes a sharp turn.

With reference to FIG. 2, the towed array 40 employs a set of inertial measurement units 42, 44, 46, 48 and 50, to determine the vector directions $\vec{e}_i$, i=1, . . . , M. The heading $\vec{e}_s$ of vessel 38 is provided by the master navigation system 30. Lateral position of points along an interval of the towed array between two adjacent remote inertial units is estimated (assuming a constant heading derivative, i.e., constant curvature) based on the heading estimates from the two adjacent sensors. These heading estimates are obtained using the measurements of force and angular change made by each individual inertial sensor. Change in depth of the towline between two adjacent remote inertial sensors is similarly obtained using attitude estimates from the two adjacent sensors.

The principal mechanism for obtaining accurate towline position, velocity, heading and attitude at the locations of the remote inertial measurement units 42 through 50 is the correction process performed, in the preferred embodiment, by a shipboard Kalman filter discussed below with reference to FIG. 3. The filter receives and uses the position, velocity, heading and attitude information from the master navigation system 30 and heading and attitude estimates from each remote inertial measurement unit. A principal feature of the invention is the discovery that estimates of the towline relative position and orientation from the master navigation system 30 and the inertial sensors 42–50 converge to accurate values with time. This occurs even when the initial sensor headings and attitudes are only poorly known. Optimal reduction of towline position, velocity, heading and attitude error is naturally fastest for the least remote inertial measurement unit because of the nature of the towline relative position model.

By detailed extensive modeling of the error propagation for each remote inertial measurement unit, it has been determined that the reduction of position, velocity, heading and attitude error is principally limited by inertial sensor noises and the dynamic error of the towline relative position model.

In the preferred embodiment, a fiber optic system within the towed array 40 is used to communicate information from the sensors 42–50 to the computer 31. Projected light from the vessel 10 is used by the three sets of fiber optic gyroscopes and silicon accelerometers, not shown, located in each of the inertial measurement units 42–50 to provide encoded optical data to a computer 31 associated with the master inertial navigation system 30 on board the vessel 10. An inertial measurement unit using fiber optic gyroscopes and silicon accelerometers is described in a paper: Pavlath, G. A., "Inertial Grade Fiber Gyros," Proceedings of the National Technical Meeting of the Institute of Navigation, Jan. 26–29, 1988. Silicon accelerometers are also described in U.S. Pat. No. 4,679,434; issued Jul. 14, 1987; by R. E. Stewart, assigned to the common assignee.

Referring to FIG. 3, the signal flow will be described for determining the position and orientation of the towed array using the remote inertial units 42–50. Force and angular change information from the first inertial measurement unit 42 is supplied to a navigational computation 52 which determines the position, velocity, heading and orientation by known methods of inertial navigation. The navigational computation 52 provides a direction measurement (heading and attitude) $\vec{e}_1$ to a first relative position determination mechanism 66 for inertial unit 42. The master inertial navigation system 30 also provides a direction measurement $\vec{e}_s$ to the first relative position determination mechanism 66. The first relative position determination mechanism 66 provides a relative position estimate $\Delta \vec{P}_1$ which is combined at node 74 with a position signal $\vec{P}_s$, determined by the master inertial navigation system 30 for unit 42. The resulting $\vec{P}_{1_R}$ signal is fed forward to other branches of the system, such as node 76, and fed back to a processing node 78.

The result of the combination at node 74 is an estimate of the position of the first inertial measurement unit 42, $\vec{P}_{1_R}$, which is compared with an independent estimate $\vec{P}_1$ of the position of the first inertial measurement unit 42 from computation 52 at node 78. The position estimate $\vec{P}_1$, is computed from the force and angular change measurements made by the first inertial unit 42 by known techniques used for computing navigation variables with strapdown gyro and accelerometer measurements. The difference of the two position determinations $\vec{P}_1$ and $\vec{P}_{1_R}$ is an alignment correction signal 82, which is employed by the alignment processing mechanism 64, to obtain alignment of the first inertial measurement unit via the computation 52.

The foregoing steps are repeated for each remote inertial measurement unit 44–48 along the towed array until a position and orientation determination is made for all but the last sensor 50 (sensor M).

Force measurements made by accelerometers and angular change measurements made by the gyros from sensor M,50, are supplied to navigational computer 83 which is connected to provide a directional signal $\vec{e}_M$ to a relative position determination device 86. The output from device 86 is a relative position signal $\Delta \vec{P}_M$ which is then combined with a position signal $\vec{P}_{M-1_R}$. Both of these signals are combined at node 76 which provides feedback to node 80 in the form of a reference position signal for the Mth remote sensor, $\vec{P}_{M_R}$. This information is processed together with the position information $\vec{P}_M$ from computation 83. $\vec{P}_M$ was computed from the force and angular change measurements made by the Mth inertial measurement unit 50 and processed by conventional techniques for computing navigation variables with strapdown gyro and accelerometer measurements. The difference of the two positions $\vec{P}_M$ and $\vec{P}_{M_R}$ at node 80 is an alignment signal 88 applied to alignment processing mechanism 84 and then back to navigational computer 83 in a manner similar to that of the alignment correction signal 82.

The series of alignment processes (symbolized by blocks 64 and 84), one for each remote inertial measurement unit in the system, may collectively be mechanized as a Kalman filter 90, mechanized in the central computer 31 on-board the towing vehicle 10.

Thus, FIG. 3 shows the manner in which adjacent remote sensors produce highly accurate position, velocity and a direction (heading and attitude) vector ($\vec{e}_i$, i=0 . . . M) for each of their locations along the towed array 40. This is accomplished by the creation of error signals representing the sum of the position information derived from the master navigation unit 30 and the relative position determination mechanism 66–86 for each inertial measurement unit 42–50. This first signal ($\vec{P}_{1_R}$) is then subtracted from a second signal ($\vec{P}_1$) which is the navigational computation (52–83) derived position for each inertial unit, derived from the gyroscopes and accelerometers. The second error signal is used to reduce the error in position, velocity, heading and attitude of each remote inertial unit 42–50 over time.

Figure 4:
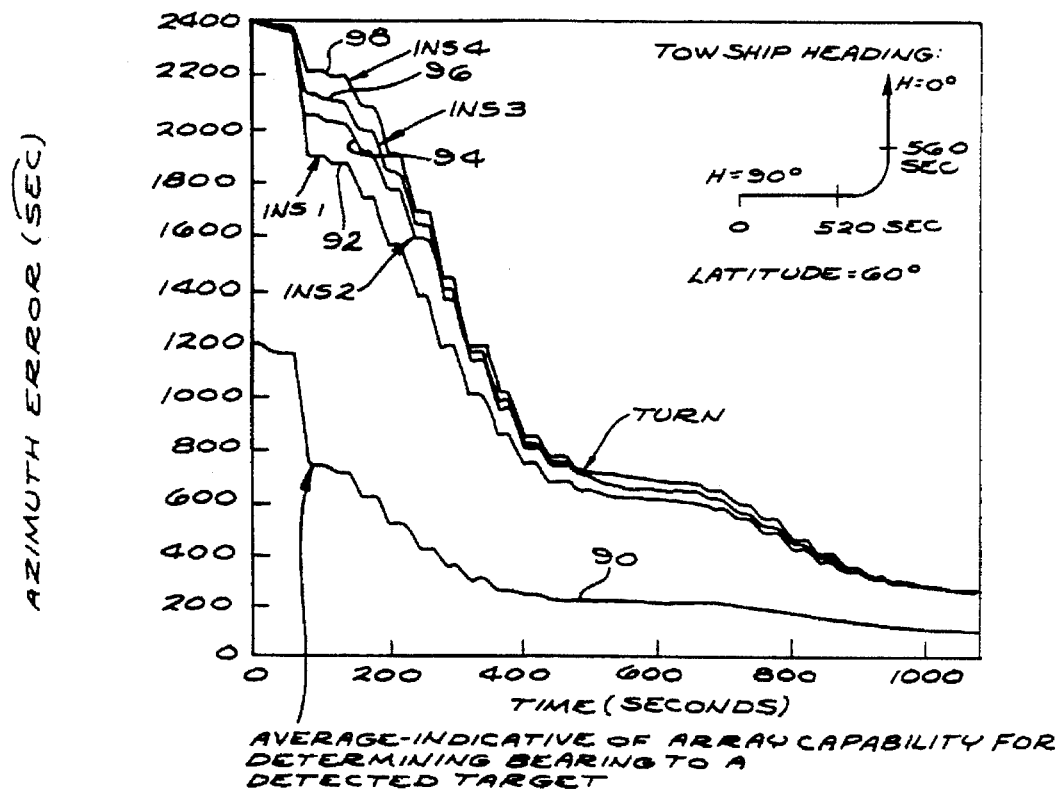
FIG. 4 is a graphic representation showing the statistical one-sigma value of heading or azimuth error versus time of four inertial measurement units in the array, in arc seconds.
Figure 5:
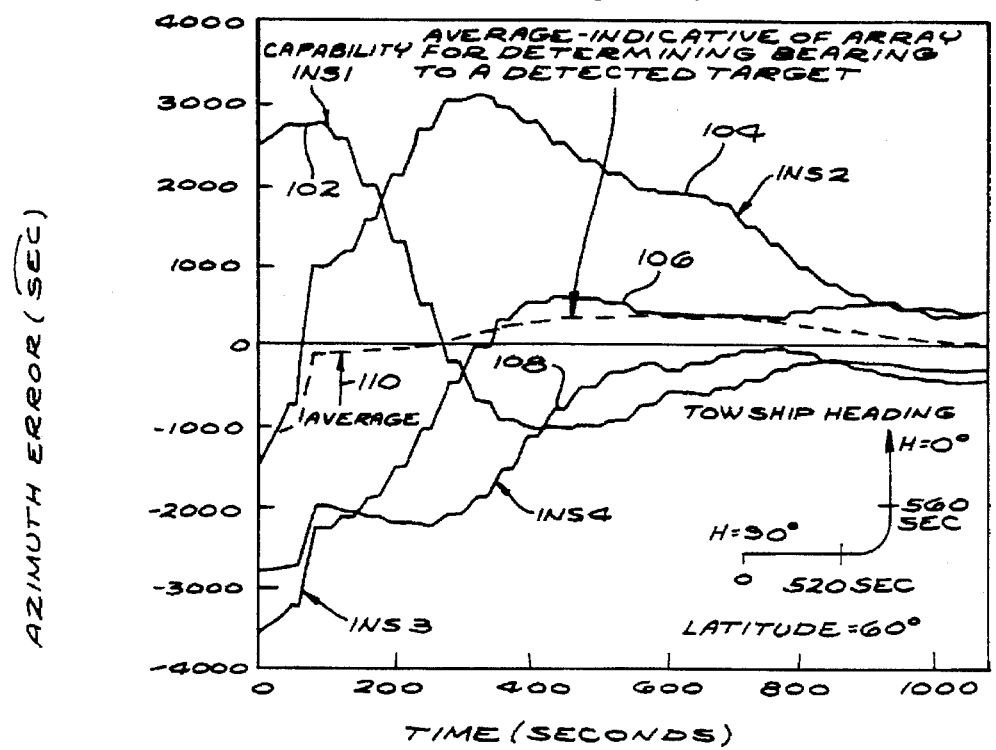
FIG. 5 is an example of the heading accuracy performance versus time of the invention for a simulation trial run for the four inertial measurement units in the towed array.

FIGS. 4 and 5 show simulated runs for a towed array 40 having four remote inertial sensors. The ship that tows the array is shown to make, over the period of a thousand seconds, a change of heading of 90°. The change begins after 520 seconds and is completed at 560 seconds, for example. The heading errors of each of the four inertial measurement units (IMU 1 through 4) are shown versus time to be between 600 and 800 arc seconds. An average which is indicative of the towed array capability for determining bearing to a detected target is shown by plot 90, which employs the results of each of the respective plots, 92, 94, 96 and 98.

FIG. 5 shows one of the numerous runs of FIG. 4, where Monte Carlo statistical methods are used to determine the heading (azimuth) errors of the four inertial measurement units for the simulated run. The dashed line indicated at 110 is the average of the errors from each of the four remote units and indicates the array targeting capability of the system.

The inertial measurement units and the position and orientation system thus described have a bandwidth such that the settling times are measured in milliseconds compared to the seconds to minutes required by competing magnetic sensors. Such a system also has the advantage that, since the sensors are inertial units, magnetic anomalies in a particular region will not affect the output of information from each of the sensors.

After initial alignment of the inertial measurement units, accurate position information for the towed array is obtained which is more accurate than that obtained by magnetic sensors.

Another important advantage of inertial units over magnetic sensors is that the inertial attitude information is accurate in three dimensions enabling acoustical array configuration estimation in three dimensions including the depth profile which is not possible with magnetic sensors.

While a particular embodiment of remote inertial measurement units positioned along a towed array extending rear-ward from a navigational vessel has been shown and described, other alternative embodiments may be considered. For example, each of the remote inertial units of the towed array need not be positioned at equal distances from one another as shown in FIG. 1 but may be positioned at various known unequal distances along the towed array. Further the embodiment may not employ fiber optic or silicon technology. Also, multiple towlines or multi-dimensional arrays may be used. The Kalman filter may be replaced by other computer techniques.

Therefore, it is intended that the following claims be construed broadly to cover both the preferred and alternative equivalent embodiments.

What is claimed is:

1. A position, velocity, heading and attitude determination system for a device towed by a vessel, comprising:

at least one inertial measurement unit located in said towed device;

an onboard master inertial navigation system;

a relative position determination mechanism for establishing a first estimate of the position of said at least one inertial measurement unit in combination with said master inertial navigation system;

said inertial measurement unit measuring force and angle change;

an onboard computer for establishing a second estimate of the position of said at least one inertial measurement unit using said measurements of force and angle change;

a differencing mechanism for determining the difference between said first and second estimates of the position of said at least one inertial measurement unit to create a correction signal; and a processor mechanism for applying said correction signal to said computer to correct said first and second estimates of the position of said at least one inertial measurement unit.

2. The position, velocity, heading and attitude determination system of claim 1, wherein:

said onboard master inertial navigation system generates a first orientation signal;

said onboard computer generates a second orientation; and said first and second orientation signals are applied to said relative position determination mechanism to reduce the error in said first estimate of the position of said at least one inertial measurement unit.

3. The position, velocity, heading and attitude determination system of claim 1, wherein:

said device towed by a vessel is a towed array;

said at least one inertial measurement unit is a plurality of such units located at pre-determined intervals along said towed array; and a relative position determination mechanism, a differencing mechanism, and a processing mechanism is each connected to one of said plurality of inertial measurement units whereby the inertial measurement unit closest to said vessel is corrected for position before the next such unit along said array is corrected for position.

4. The position, velocity, heading and attitude determination system of claim 3, wherein:

said force and angle change measurements from said inertial measurement units in said towed array are operatively connected to said onboard computer by fiber optics.

5. The position, velocity, heading and attitude determination system of claim 3, wherein said plurality of inertial measurement units comprise:

a triad of gyroscopes and accelerometers.

6. The position, velocity, heading and attitude determination system of claim 3, wherein said plurality of inertial measurement units, comprise:

a triad of fiber optic gyroscopes and silicon accelerometers.

* * * * *